United States Patent
Gupta et al.

(10) Patent No.: US 11,526,553 B2
(45) Date of Patent: Dec. 13, 2022

(54) BUILDING A DYNAMIC REGULAR EXPRESSION FROM SAMPLED DATA

(71) Applicant: VMware, Inc., Palo Alto, CA (US)

(72) Inventors: Ashutosh Gupta, San Jose, CA (US);
Prajval Bavi, Palo Alto, CA (US);
Gaurav Rastogi, Palo Alto, CA (US);
Jonathan Yue, Danville, CA (US);
Malhar Singh, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 162 days.

(21) Appl. No.: 16/936,693

(22) Filed: Jul. 23, 2020

(65) Prior Publication Data

US 2022/0027418 A1    Jan. 27, 2022

(51) Int. Cl.
| G06F 16/903 | (2019.01) |
| G06F 16/906 | (2019.01) |
| G06F 16/955 | (2019.01) |

(52) U.S. Cl.
CPC ...... *G06F 16/90344* (2019.01); *G06F 16/906* (2019.01); *G06F 16/9566* (2019.01)

(58) Field of Classification Search
CPC ............. G06F 16/90344; G06F 16/906; G06F 16/9566
USPC .......................................................... 707/738
See application file for complete search history.

(56) References Cited

U.S. PATENT DOCUMENTS

| 5,905,990 | A * | 5/1999 | Inglett ..................... G06F 16/10 |
| 6,604,143 | B1 * | 8/2003 | Nagar ................. G06F 16/9535 709/227 |
| 10,552,122 | B2 * | 2/2020 | Venkata .................... G06F 8/34 |
| 2001/0032205 | A1 * | 10/2001 | Kubaitis ................ G06F 16/951 |
| 2005/0055365 | A1 * | 3/2005 | Ramakrishnan .... G06F 16/3328 707/999.102 |
| 2005/0108554 | A1 * | 5/2005 | Rubin .................... G06F 21/562 713/187 |
| 2005/0240999 | A1 * | 10/2005 | Rubin .................... G06F 21/563 726/22 |
| 2005/0289182 | A1 * | 12/2005 | Pandian ................. G06Q 10/10 |
| 2006/0047500 | A1 * | 3/2006 | Humphreys .......... G06F 40/295 704/9 |
| 2007/0192863 | A1 * | 8/2007 | Kapoor ................. H04L 63/145 726/23 |

(Continued)

*Primary Examiner* — Tony Mahmoudi
*Assistant Examiner* — Michael Le
(74) *Attorney, Agent, or Firm* — Patterson & Sheridan, LLP

(57) ABSTRACT

Described are systems and methods for automatically generating, by a computing device, a regular expression that matches a list of input strings. A method includes identifying a set of baseline regular expression classes that match a portion of an input string of the list of input strings. The method further generates a current regular expression as a sequence of baseline regular expression classes from the set of baseline regular expression classes based on matching baseline regular expression classes to characters of a first input string of the list of input strings. The method further determines whether the current regular expression matches all input strings of the list of input strings, and if it does not, the method regenerates a portion of the current regular expression that occurs after an earliest character, in order, of one of the one or more input strings, that does not match the current regular expression.

20 Claims, 9 Drawing Sheets

(56) References Cited

U.S. PATENT DOCUMENTS

| | | | |
|---|---|---|---|
| 2007/0198565 A1* | 8/2007 | Ivanov | G06F 40/169 707/999.102 |
| 2007/0250504 A1* | 10/2007 | Chen | G06Q 10/10 |
| 2008/0133443 A1* | 6/2008 | Bohannon | G06F 40/205 706/48 |
| 2008/0208850 A1* | 8/2008 | Boyce | G06F 16/22 |
| 2008/0228466 A1* | 9/2008 | Sudhakar | G06F 11/3692 704/9 |
| 2008/0229415 A1* | 9/2008 | Kapoor | H04L 63/14 726/22 |
| 2008/0262990 A1* | 10/2008 | Kapoor | H04L 63/1483 706/20 |
| 2008/0262991 A1* | 10/2008 | Kapoor | H04L 63/1441 706/20 |
| 2010/0058475 A1* | 3/2010 | Thummalapenta | H04L 63/1433 714/38.14 |
| 2011/0016154 A1* | 1/2011 | Goyal | H04L 63/1425 707/E17.071 |
| 2011/0167063 A1* | 7/2011 | Tengli | G06F 16/7343 707/E17.089 |
| 2011/0213869 A1* | 9/2011 | Korsunsky | G06F 21/55 709/223 |
| 2011/0214157 A1* | 9/2011 | Korsunsky | H04L 63/1425 726/1 |
| 2011/0219035 A1* | 9/2011 | Korsunsky | G06F 21/00 707/E17.005 |
| 2011/0231510 A1* | 9/2011 | Korsunsky | G06F 21/55 709/213 |
| 2011/0231564 A1* | 9/2011 | Korsunsky | H04L 63/1483 709/231 |
| 2011/0238855 A1* | 9/2011 | Korsunsky | H04L 63/1441 709/231 |
| 2011/0252046 A1* | 10/2011 | Szabo | G06F 16/90344 707/758 |
| 2012/0124064 A1* | 5/2012 | Syrowitz | G06F 16/90344 707/E17.069 |
| 2012/0221494 A1* | 8/2012 | Pasetto | G06N 5/00 706/12 |
| 2012/0240185 A1* | 9/2012 | Kapoor | G06F 16/2358 726/1 |
| 2016/0267142 A1* | 9/2016 | Cafarella | G06F 16/24568 |
| 2018/0232351 A1* | 8/2018 | Singh | G06F 16/25 |
| 2019/0385014 A1* | 12/2019 | Malak | G06F 16/3338 |
| 2020/0012784 A1* | 1/2020 | Orihara | H04L 63/1425 |
| 2020/0320068 A1* | 10/2020 | Malak | G06F 16/2423 |
| 2020/0320092 A1* | 10/2020 | Malak | G06F 16/258 |
| 2020/0320142 A1* | 10/2020 | Malak | G06F 16/242 |
| 2021/0168121 A1* | 6/2021 | Miyamoto | G06F 13/00 |
| 2021/0382947 A1* | 12/2021 | Garty | G06K 9/6218 |

\* cited by examiner

BUILDING A DYNAMIC REGULAR EXPRESSION FROM SAMPLED DATA

BACKGROUND

A regular expression (also referred to as a regex or regexp) is a sequence of characters that define a search pattern. For example, a regex may refer to the specific, standard textual syntax for representing patterns for matching text. Each character in a regex is either a metacharacter having a special meaning (e.g., wildcard, a quantification, etc.) or a regular character having a literal meaning. For example, the regex "colou?r" matches the strings "color" and "colour." The characters c, o, l, o, u, and r are regular characters. The character ? is a metacharacter indicating that there should be zero or one occurrences of the preceding element "u". Another example of a regex is (int){3}(punc){1}, which matches any string having 3 integers followed by a punctuation, such as "456!".

The use of metacharacters can allow the regex pattern matches to vary from a precise equality to a very general similarity. For example, the regex pattern "." matches any character, while the regex pattern "[a-z]" matches all lower case letters from a to z which is more precise, and the regex pattern "a" matches only the character a, which is even more precise.

Regexes are widely used in many applications in computer science where there is a need to identify matching strings, such as for string-searching algorithms, "find" operations on strings, "find and replace" operations on strings, input validation, etc. For example, regexes can be used in applications such as search engines for finding relevant web pages, word processors for searching text, etc.

Typically, a regex is created manually by a user after inspecting some data set including strings the user wants to capture using a regex. For example, the various strings (e.g., desired strings to be matched by the regex) in the data set may share some common pattern, and the user figures out the pattern and creates a regex corresponding to that pattern. Such manual creation of a regex can be difficult, such as when the data set is large and/or the common pattern between strings to be matched is complex.

SUMMARY

In certain embodiments, a (e.g., highly efficient and deterministic) model examines sampled data and automatically generates (e.g., complex and highly specific) regular expressions. Certain embodiments described herein use a two-phase approach, which can be further optimized on a per need basis. In phase 1, a set of baseline regular expression classes is built for a list of input strings derived from sampled input data. In phase 2, the baseline regular expression classes are used to build a regular expression that matches all of the input strings in the list of input strings.

One embodiment provides a method of automatically generating, by a computing device, a regular expression that matches a list of input strings. The method includes obtaining the list of input strings. The method further includes identifying a set of baseline regular expression classes that each match at least a portion of at least one input string of the list of input strings, each baseline regular expression class being a representation of a corresponding type of character. The method further includes generating a current regular expression as a sequence of baseline regular expression classes from the set of baseline regular expression classes based on matching baseline regular expression classes to characters of a first input string of the list of input strings. The method further includes determining whether the current regular expression matches all input strings of the list of input strings. The method further includes when the current regular expression matches all input strings of the list of input strings, setting the current regular expression as the regular expression. The method further includes when the current regular expression does not match one or more input strings of the list of input strings, regenerating a portion of the current regular expression that occurs after an earliest character, in order, of one of the one or more input strings, that does not match the current regular expression.

Further embodiments include a computer-readable medium containing instructions that, when executed by a computing device, cause the computing device to carry out one more aspects of one or more of the above methods, and a system comprising memory and a processor configured to carry out one or more aspects of one or more of the above methods.

DETAILED DESCRIPTION

Figure 1A:
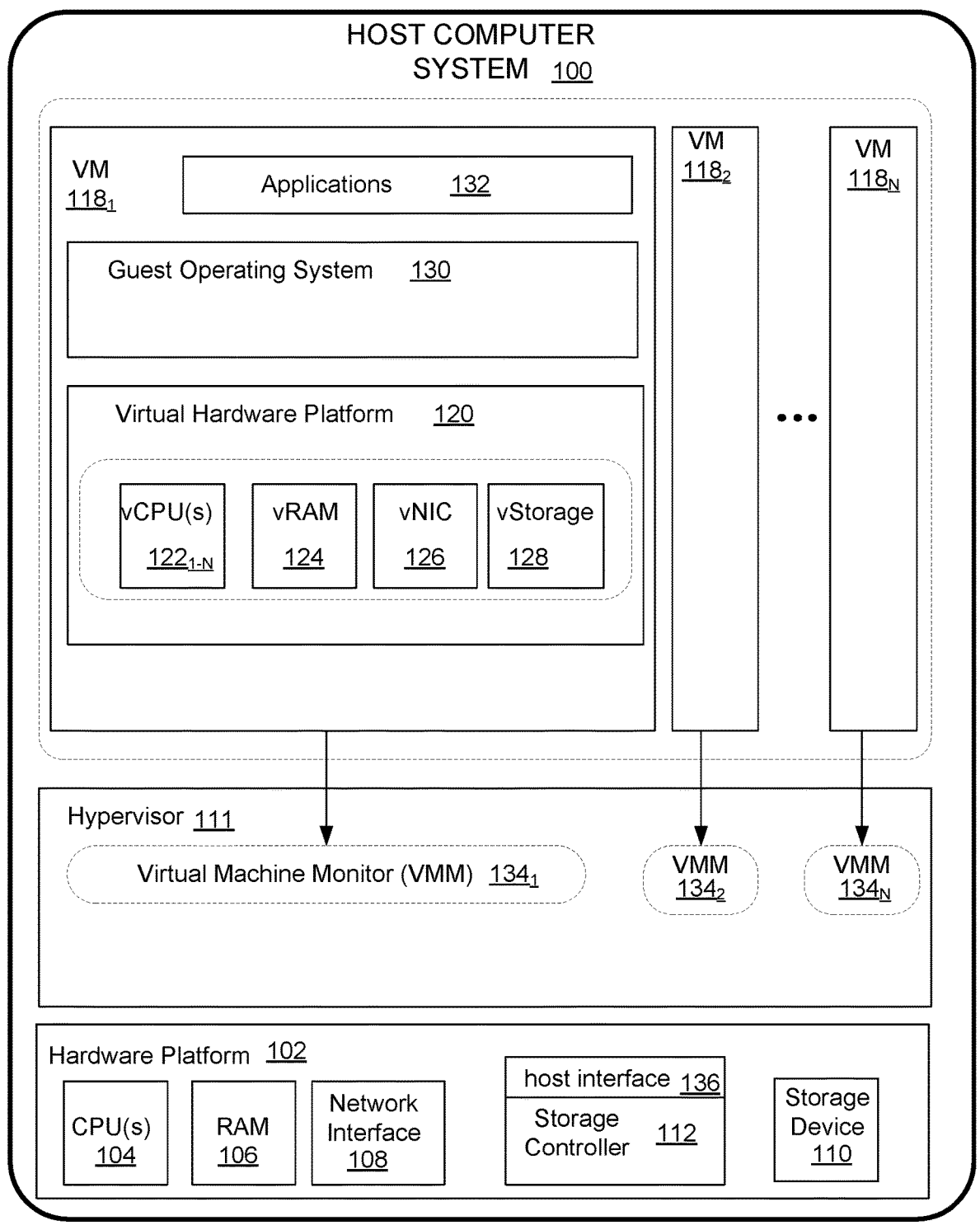
FIG. 1A depicts a block diagram of a computer system that is representative of a virtualized computer architecture.

As discussed, manual creation of a regex that matches a set of strings is a difficult process. Accordingly, embodiments described herein provide automated techniques for creating regexes that match a set of strings. The automated techniques provide an efficient and deterministic model, which takes as input sampled data (e.g., comprising a set of strings the regex pattern should match, such as sampled from a larger set of available data), and automatically generates a (e.g., highly specific and complex) regex that matches the input sampled data. The efficiency of the model improves the functionality of a computing device, allowing the computing device to use less processing power/compute cycles to generate a regex as compared to other models of generating a regex. Certain examples are discussed with respect to utilizing HTTP request(s) consisting of a named-value pair as the sampled data, however, it should be noted that the techniques can be applied to any suitable data.

In some cases, a regex can be built to filter out incoming URLs to process in a browser only a particular set of URLs that are variations of the incoming URLs. In some cases, a regex can be built to search for filenames in a file system.

Certain embodiments provide a two phase approach to automated/dynamic creation/building of a regex. In certain embodiments, in a first phase (i.e., phase 1), baseline regex classes are identified and/or built for the sampled data comprising multiple input strings. Further, in a second phase (i.e., phase 2), the baseline regex classes are used to build a specific regex that matches all of the sampled data.

For example, for phase 1, for a first string of the multiple strings, all the possible combinations of baseline regex classes that can be used to classify parts of the first string, and baseline regex classes that can be used to classify the complete string, are identified, as described in more detail herein in an example with respect to Tables 1 and 2. In certain embodiments, baseline regex classes include predefined baseline regex classes. Such predefined baseline regex classes may include, for example, a digit (e.g., int), an uppercase character (e.g., upper), a lower case character (e.g., lower), and a punctuation (e.g., punc), which basically covers all the possible general characters found in the English language.

In certain embodiments, baseline regex classes include refined baseline regex classes built from a separation of one or more classes from a predefined baseline regex class such that the refined baseline regex class is narrower and matches fewer characters than a predefined baseline regex class from which the refined baseline regex class is built. For example, the punctuation class includes the hyphen class and the underscore class. The hyphen class and underscore class may be separated from the underscore class as refined baseline regex classes.

Further, in certain embodiments, baseline regex classes include generated baseline regex classes. In certain embodiments, a generated baseline regex class may be built as a combination of predefined baseline regex classes and/or refined baseline regex classes to generate a baseline regex class that is wider and matches more characters than a predefined baseline and/or refined regex class from which the generated baseline regex class is built. For example, a generated baseline regex class may be generated as the combination of predefined baseline regex classes int and upper and referred to as int_upper. The generated baseline regex class int_upper would match any character that is an int or an upper.

Further, for example, in phase 2, the identified baseline regex classes from phase 1 for the sampled data are used to build a specific regex for the sampled data that matches over all of the multiple strings of the sampled data, as discussed in more detail herein. The specific regex may be defined as an ordered sequence of a plurality of the identified baseline regex classes.

In an example, in phase 2, one of the plurality of strings (e.g., different than or the same as the input string used to identify the baseline regex classes in phase 1) is selected (e.g., at random). Further, all the identified baseline regex classes that match one or more characters starting at the first character of the selected string are selected. From the selected baseline regex classes, a "best" baseline regex class is determined. In certain embodiments, the baseline regex class is determined as the "best" based on a function of the overall depth of a tree corresponding to the baseline regex classes, as discussed further herein. More generally, in certain embodiments, the baseline regex class determined as the "best" is the selected baseline regex class that matches the least number of characters from all possible characters that exist. The determined best baseline regex class matches the selected string up to a certain length of characters.

Continuing in phase 2, all the identified baseline regex classes that match one or more characters starting at the next character after the last character matched by the previously determined best baseline regex class for the selected string are selected. Similarly, a best baseline regex class is determined from the selected baseline regex classes. The determination of best baseline regex classes is iteratively performed until all of the characters of the selected string are matched. The sequence of the determined best baseline regex classes is then a specific regex for the selected string.

The specific regex for the selected string may then be tested to see if it matches all the strings of the sampled data. If it does, the specific regex for the sampled data that matches over all of the multiple strings of the sampled data is found and the process can end. However, if one or more of the strings of the sampled data do not match the specific regex for the selected string, the specific regex build process is restarted from the point of failure using one of the one or more strings that did not match the specific regex for the selected string. The point of failure is the earliest character in order, starting from the first character, after which the specific regex for the selected string did not match the one of the one or more strings.

Accordingly certain embodiments provide an automated technique to generate a specific regex for matching to a set of strings.

FIG. 1A depicts a block diagram of a computer system 100 that is representative of a virtualized computer architecture that may be used to automatically generate a regex according to embodiments described herein. As is illustrated, host computer system 100 supports multiple virtual machines (VMs) 118$_1$-118$_N$, which are an example of virtual computing instances that run on and share a common hardware platform 102. For example, a VM 118 may be used to run a process to automatically generate a regex according to embodiments described herein. Hardware platform 102 includes conventional computer hardware components, such as random access memory (RAM) 106, one or more network interfaces 108, storage controller 112 with host interface 136, persistent storage device 110, and one or more central processing units (CPUs) 104. The sampled data used to generate a regex may be stored in RAM 106 and/or storage device 110. Central processing units 104 may include processing units having multiple cores.

A virtualization software layer, hereinafter referred to as a hypervisor 111, is installed on top of hardware platform 102. Hypervisor 111 makes possible the concurrent instantiation and execution of one or more VMs 118$_1$-118$_N$. The interaction of a VM 118 with hypervisor 111 is facilitated by the virtual machine monitors (VMMs) 134$_1$-134$_N$. Each VMM 134$_1$-134$_N$ is assigned to and monitors a corresponding VM 118$_1$-118$_N$. In an alternative embodiment, hypervisor 111 runs on top of a host operating system, which itself runs on hardware platform 102. In such an embodiment, hypervisor 111 operates above an abstraction level provided by the host operating system.

After instantiation, each VM 118$_1$-118$_N$ encapsulates a virtual hardware platform 120 that is executed under the control of hypervisor 111. Virtual hardware platform 120 of VM 118$_1$, for example, includes but is not limited to such virtual devices as one or more virtual CPUs (vCPUs) 122$_1$-122$_N$, a virtual random access memory (vRAM) 124, a virtual network interface adapter (vNIC) 126, and virtual storage (vStorage) 128. Virtual hardware platform 120 supports the installation of a guest operating system (guest OS) 130, which is capable of executing applications 132, such as an application for generating a regex according to embodiments described herein. Examples of guest OS 130 include any of the well-known operating systems, such as the Microsoft Windows™ operating system, the Linux™ operating system, and the like.

Figure 1B:
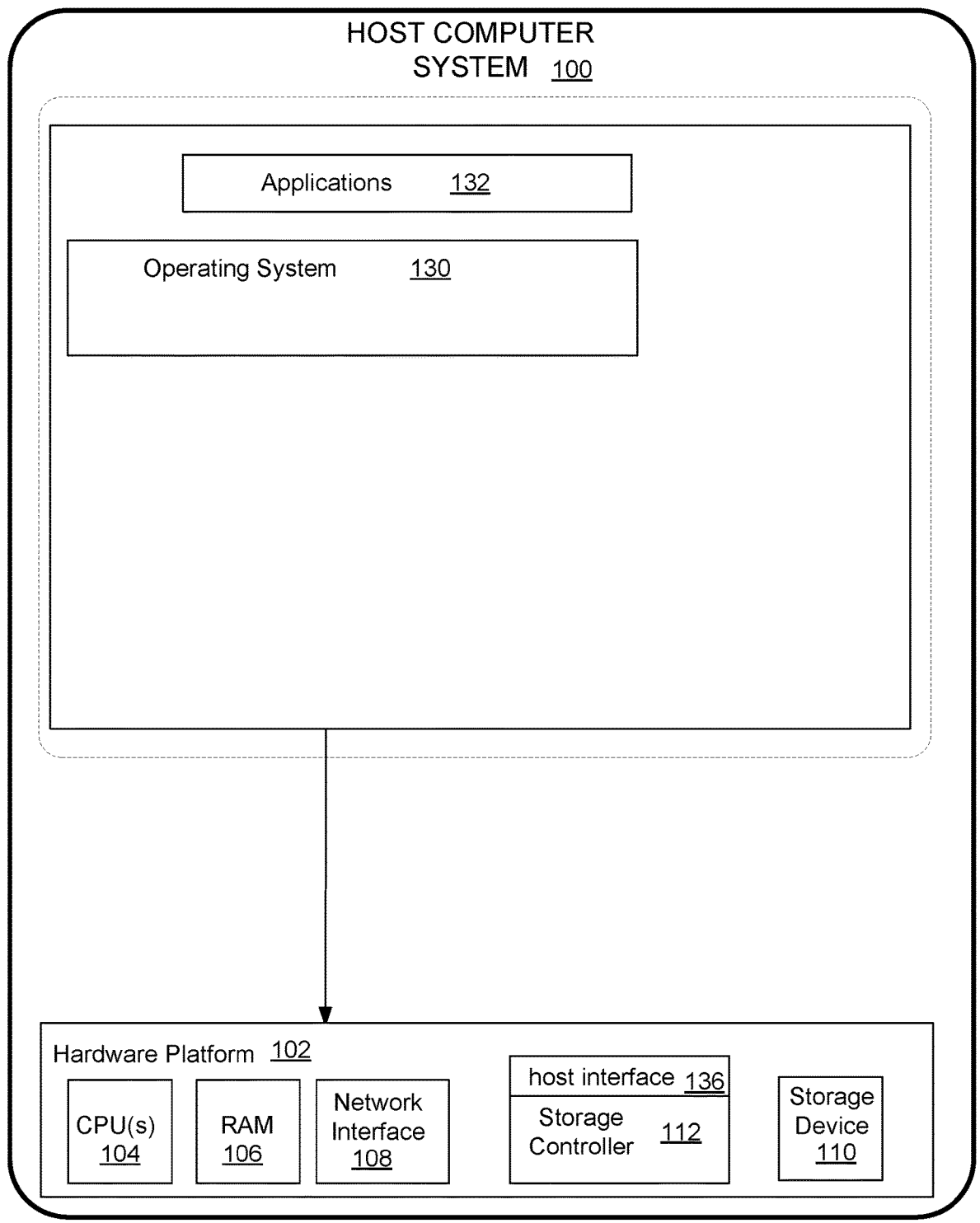
FIG. 1B depicts a block diagram of a computer system that is representative of a non-virtualized computer architecture.

FIG. 1B depicts a block diagram of a computer system 100 that is representative of a non-virtualized computer architecture. Host computer system 100 includes hardware platform 102 and operating system 130 running on hardware platform 102. Operating system 130 executes applications 132, such as an application for generating a regex according to embodiments described herein. Examples of OS 130 include any of the well-known operating systems, such as the Microsoft Windows™ operating system, the Linux™ operating system, and the like.

Figure 2:
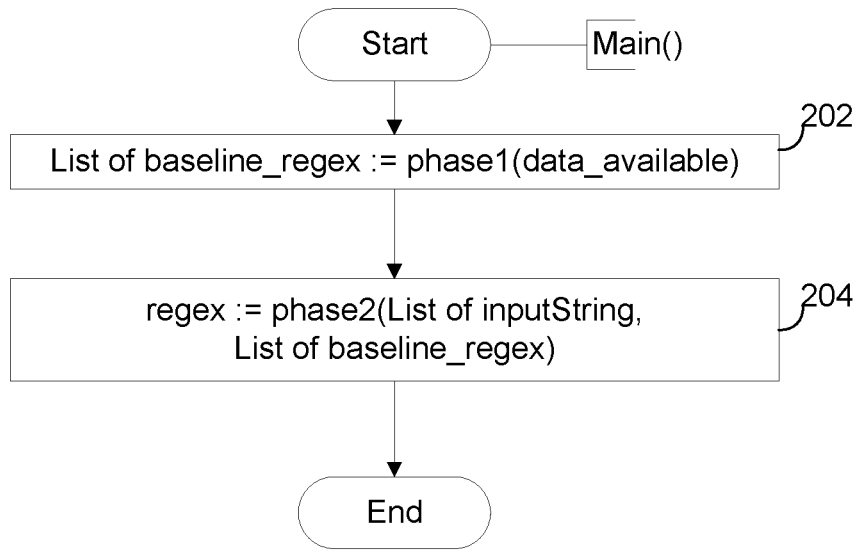
FIG. 2 depicts a flow of operations of a top-level method to formulate a regular expression, in an embodiment.

FIG. 2 depicts a flow of operations of the top-level method to formulate a regular expression, in an embodiment. As shown in the figure, in step 202, the top-level method executes a phase 1 function on the data on which the regular expression is to be formulated. In step 204, the top-level method executes a phase 2 function that obtains the regular expression for the given data. In one embodiment, the top-level method is executed as an application 132. In another embodiment, the top-level method is executed by hypervisor 111. In yet another embodiment, the top-level method is executed by an operating system 130.

Figure 3:
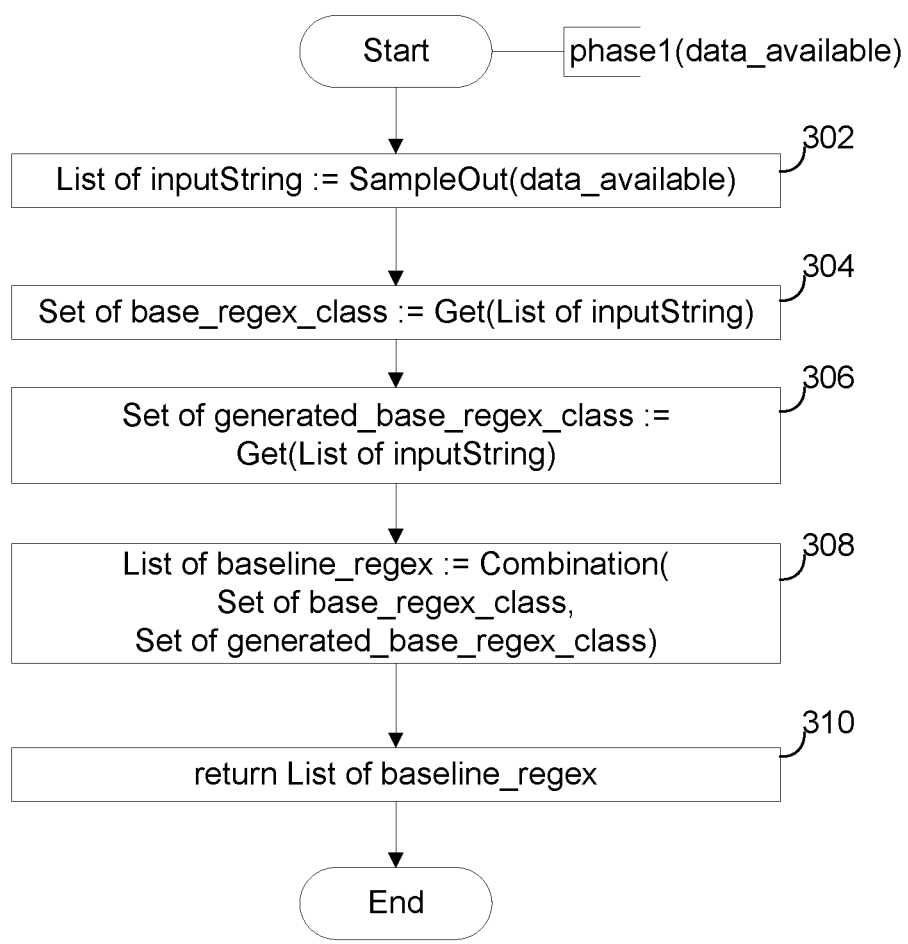
FIG. 3 depicts a flow of operations of phase 1 of the method of FIG. 2, in an embodiment.

FIG. 3 depicts a flow of operations of phase 1 of the method, in an embodiment. In step 302, phase 1 samples the data available to obtain a list of input strings over which the regular expression is to be formed and applied. In certain embodiments, additional input strings may be generated from one or more input strings received to increase the number of obtained input strings over which the regular expression is to be formed and applied. For example, if a first string is received, phase 1 itself can alter the first string by adding white space, punctuation, and/or altering the case to generate a set of variations of the first string that can be used as additional input strings to form the obtained list of input strings.

Figure 4:
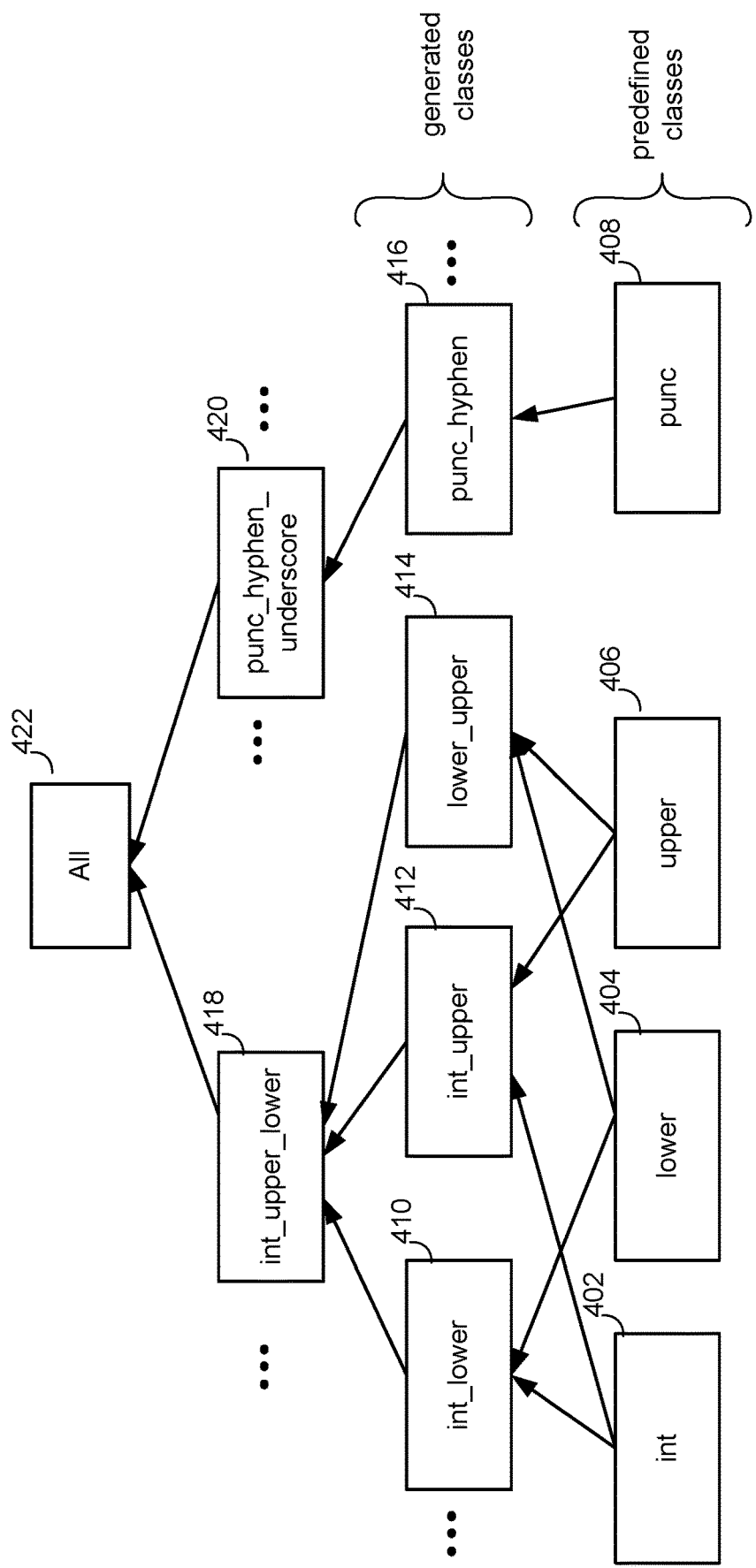
FIG. 4 depicts a tree of baseline regular expression classes, in an embodiment.
Figure 5:
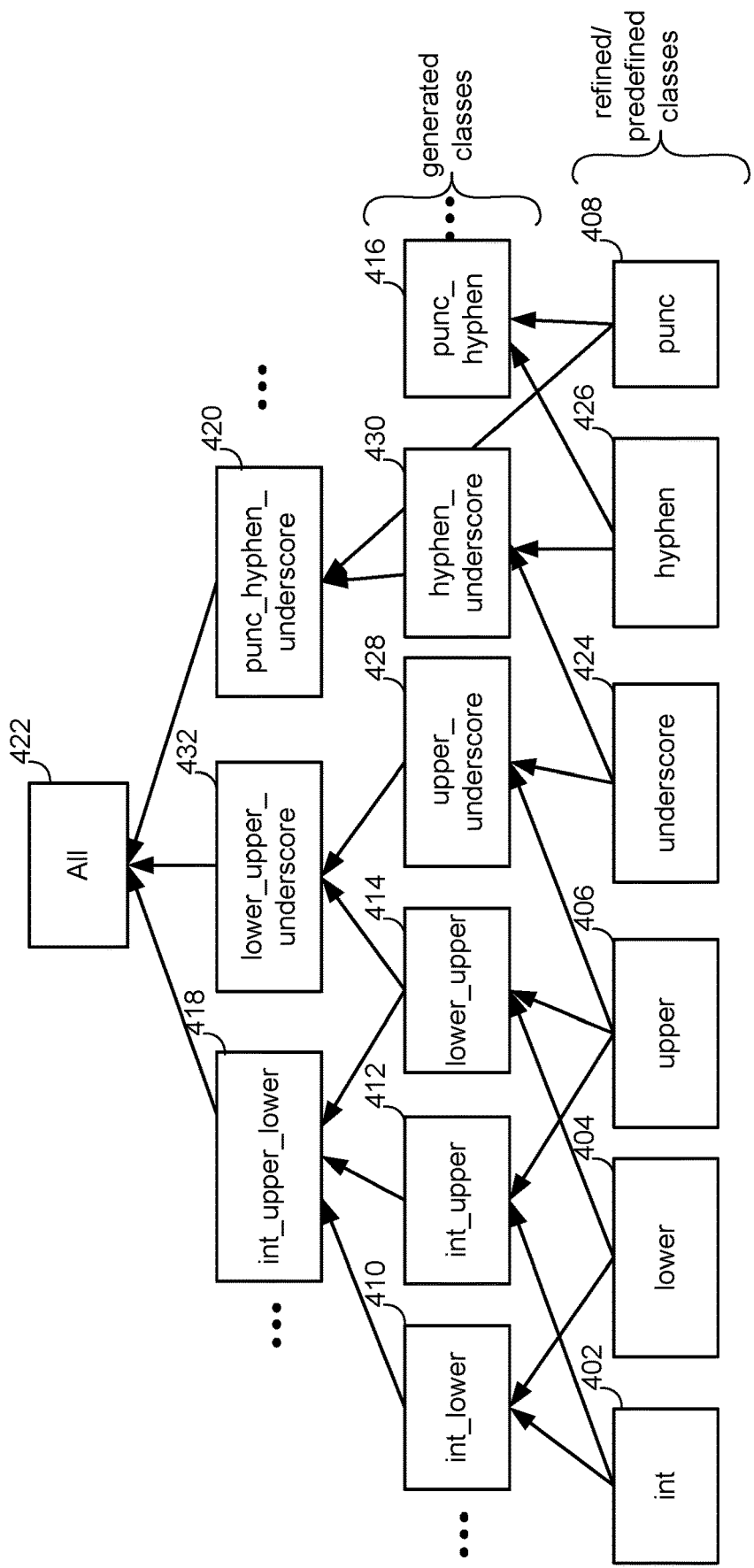
FIG. 5 depicts a tree of baseline regular expression classes, in an embodiment.

In step 304, the phase 1 function gets a set of predefined (and optionally refined) baseline regular expression classes (base_regex_class) based on the list of input strings, as further described in reference to FIGS. 4 and 5. As discussed, baseline regular expression classes can be predefined. Further, in certain embodiments, baseline regular expression classes can be generated (e.g., as described with respect to FIGS. 4 and 5) and/or refined (e.g., as described with respect to FIG. 5), such as tailored to the list of input strings. In certain aspects, using refined baseline regular expression classes changes the way the generated baseline regular expression classes are constructed and gives more representation, but at the cost of complexity in constructing the final regular expression. Finer representations of classes can be applied to all the different input strings in the list of input strings.

In step 306, optionally, the phase 1 function gets a set of generated baseline regular expression classes (generated_base_regex_class) based on the predefined and/or refined baseline regular expression classes, as depicted in FIGS. 4 and 5. The generated baseline regular expression classes combine the predefined and/or refined baseline regular expression classes to generate more inclusive classes such as (integer+uppercase character) or (uppercase character+lowercase character) and so on, as shown in FIGS. 4 and 5.

In step 308, phase 1 creates all combinations of the set of baseline regular expression classes (e.g., predefined, generated, and/or refined) (baseline regex). These combinations are used to classify parts of the input string, as well as the complete input string, and are called baseline regular expression classes for a particular string.

In step 310, phase 1 returns the list of baseline regular expressions for use in phase 2.

FIG. 4 depicts an inverted tree of predefined baseline regular expression classes and generated baseline regular expression classes, in an embodiment. As shown, the leaves of the tree are the predefined baseline regular expression classes, which include integers 402, lower case alpha characters 404, upper case alpha characters 406, and punctuation 408. The levels above the leaves are the generated baseline regular expression classes, which include combinations of the predefined baseline regular expression classes, such as int_lower 410, int_upper 412, lower_upper 414, where int_lower 410 is a combination of the integer class 402 and the lower case class 404, int_upper 412 is the combination of the integer class 402 and the upper case class 406, lower_upper 414 is a combination of upper case class 406 and lower case class 404, punc_hyphen 416 is a combination of the hyphen and punctuation class items 408, int_upper_lower 418 is a combination of integer class 402, upper case class 406 and lower case class 404, and punc_hyphen_underscore 420 is a combination of the hyphen, underscore, and punctuation class items 408. The leaves of the tree have higher priority for selection of a class in phase 2, and the classes that are closer to the top of the tree have a lower priority for selection in phase 2.

FIG. 5 depicts a tree of refined and predefined baseline regular expression classes and generated baseline regular expression classes, in an embodiment. As shown, the tree in FIG. 5 is similar to that of FIG. 4, except that in the punctuation class 408, the underscore class 424 and hyphen class 426 are separated from the rest of the punctuation class 408, making these classes refined baseline regular expression classes. The separation of some of the common punctuation classes allows specific generated baseline regular expression classes to be formed, such as upper_underscore 428, lower_upper_underscore 432, and hyphen_underscore 430. With the underscore class and hyphen class explicitly separated, the dependence of punc_hyphen 416 on punc class 408 and hyphen class 426, the dependence of hyphen_underscore class 430 on hyphen class 426 and underscore class 424, and the dependence of punc_hyphen_underscore 430 on punc class 408 and hyphen_underscore class 430 are represented by arrows in FIG. 5. Of course, there can be many more generated and/or refined baseline regular expression classes than those shown in the figure. Many combinations of the baseline regular expression classes are possible, as indicated by the dots in FIGS. 4 and 5.

Figure 6:
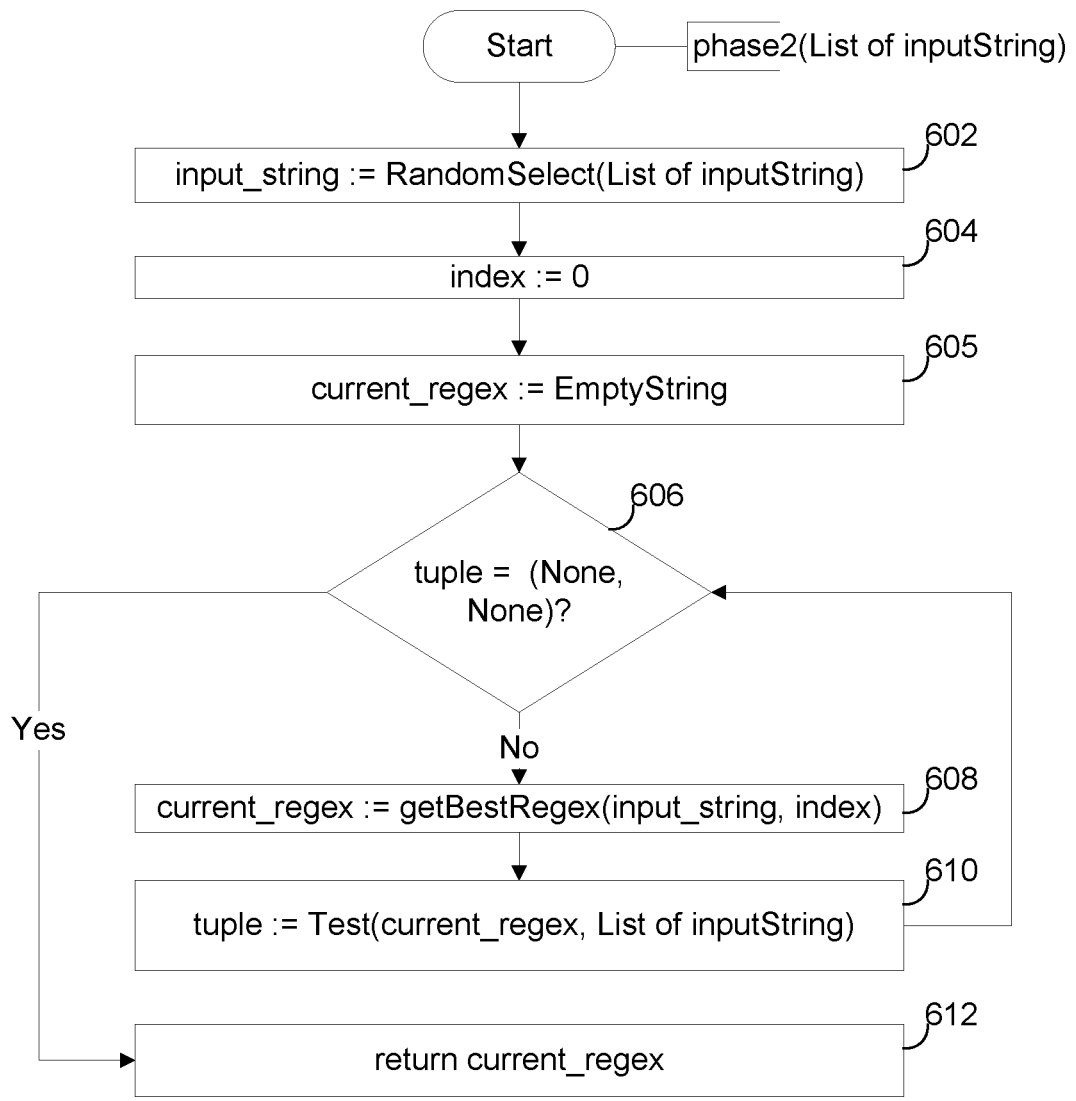
FIG. 6 depicts a flow of operations of phase 2 of the method of FIG. 2, in an embodiment.

FIG. 6 depicts a flow of operations of phase 2 of the method, in an embodiment.

In step 602, phase 2 randomly selects one of the input strings from the list of input strings as the starting input string (input_string).

In step 604, the function sets an index to 0 to point to the first character in the n-length input_string, each string having an index of 0 for its first character and an index of n−1 for the last character in the string.

In step 605, the function initializes the current regex variable to an empty string, the current_regex variable at the end of phase 2 corresponding to the specific regex matching the list of input strings.

In step 606, the function tests whether the tuple of input_string and index=(None, None). Because input_string is the selected string, the tuple is not equal to (None, None). The function then proceeds to step 608.

In step 608, the function executes the getBestRegex function, which gets the best regular expression for the input_string. This regular expression becomes current_regex.

In step 610, the function executes the Test function, which attempts to test all of the input strings in the list of input strings against the current_regex. If the current regular expression (current_regex) matches all of the input strings, then the Test function returns a tuple, which is (None, None) and goes back to step 606, which then returns the final regular expression in step 612.

However, if, in step 610, the Test function finds a string that fails to match to the current regular expression, the Test function returns the tuple (input_string, index), which gives the input string and character position in the input string at which the mismatch occurred. The function then returns to step 608 to re-execute the getBestRegex function with the input string and index provided by the Test function and obtains a new current regular expression. The function then tests the list of input strings with the new current regular expression in step 610. The loop of steps 606, 608, and 610 continues until the current regular expression matches all of the input strings.

Figure 7:
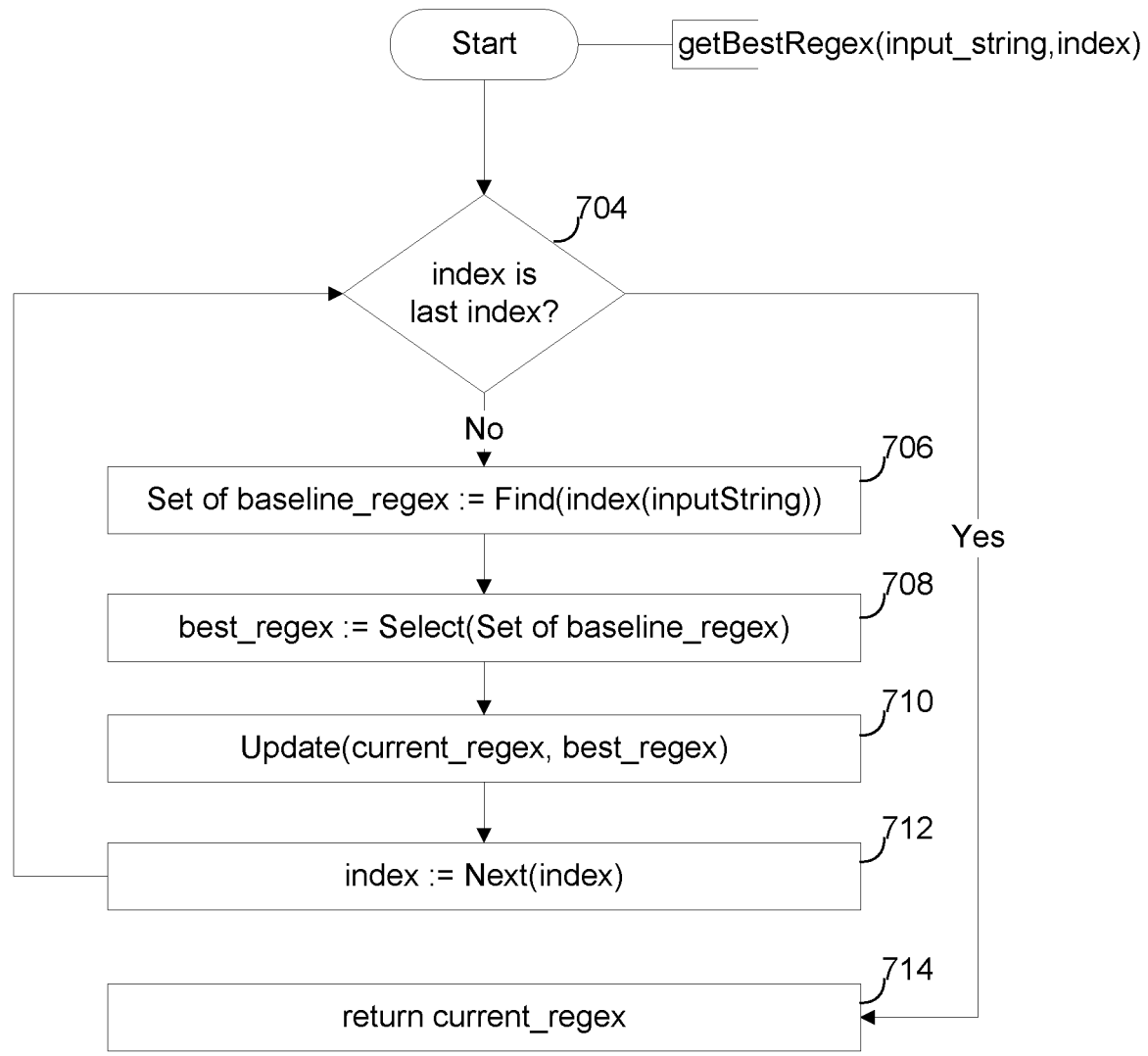
FIG. 7 depicts a flow of operations of a function that gets the best regular expression for a given input string, in an embodiment.

FIG. 7 depicts a flow of operations of the getBestRegex function, which gets the best regular expression for a given input string, in an embodiment. In step 704, the function determines whether the index points to the last character in the string. If not, then in step 706, the function finds a set of baseline regular expression classes (baseline_regex classes) for the character pointed to by the index. In step 708, the function selects the best baseline regular expression class (best_regex class) from the set of baseline_regex classes found in step 706. The selection is based on priority in the class tree (e.g., FIG. 4 or FIG. 5), which can be adjusted depending on the type of strings to which the regular expression is applied. For example, in certain embodiments, the best_regex class is the baseline_regex class with the highest priority if a base_regex_class matches or a lower priority than the base_regex_class if one of the generated_base_regex_class matches. Thus, selecting the best_regex class walks up the tree in FIG. 4 or 5 starting at the leaves to find a baseline_regex class that matches character types encountered at the index. More generally, in certain embodiments, the best_regex class is the baseline_regex class that matches the least number of characters from all possible characters that exist, meaning it is the narrowest of the baseline_regex classes.

In step 710, the function updates the current_regex with the best_regex class. The update includes either appending the best_regex class to the current_regex if the index position in the current_regex is empty or altering contents at the index position in the current_regex based on the combination of the best_regex class and the current_regex for the character to which the index points. In step 712, the function moves the index to point to the next character in the string and goes back to step 704 to determine if the index points to the last character. The loop of steps 704, 706, 708, 710, 712 continues until a current_regex has been constructed for the entire input string. In step 714, the function returns with the current_regex, which works for the given input string.

Figure 8:
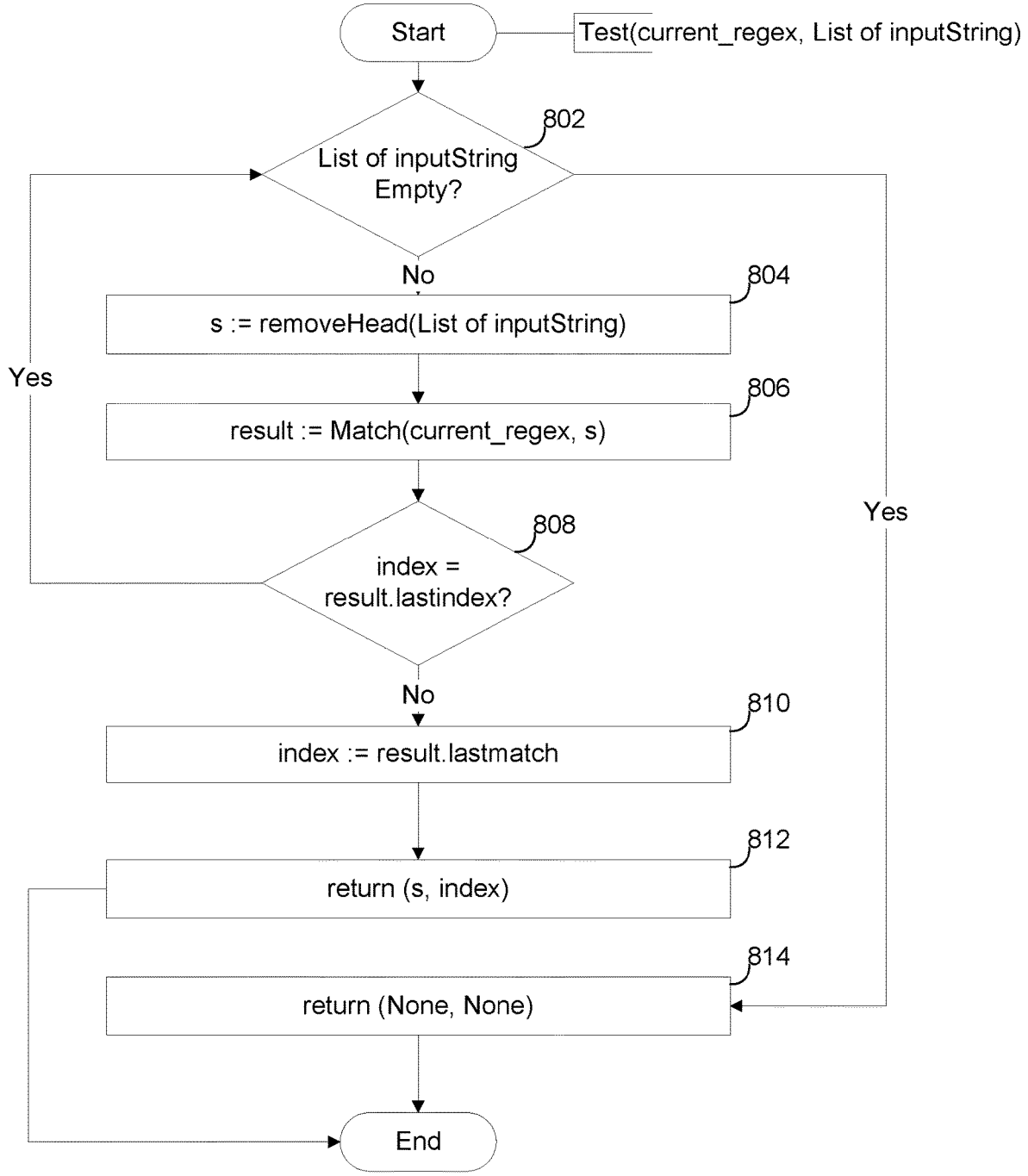
FIG. 8 depicts a flow of operations of a function that tests the current regular expression against the list of input strings, in an embodiment.

FIG. 8 depicts a flow of operations of the Test function, which attempts to test the current regular expression against all of the input strings, in an embodiment.

In step 802, the function tests whether the list of input strings is empty, which is not the case in the first pass after the start. In step 804, the function removes the head of the list of input strings and assigns it to a string variable "s". In step 806, the function performs a match on the current string variable "s" using the current regular expression, current_regex. If the result of the match indicates, in step 808, that the regular expression matched all the way to the last index of the current string, the function goes back to step 802 and 804 to test the next string. The loop of steps 802, 804, 806, 808 continues until either the last string is tested or the current_regex does not match one of the strings. If the function reaches the last string without any mismatches, it returns the tuple (None, None) in step 814. If the function finds a string that mismatches, then the index is obtained in step 810, and the function returns the tuple (s, index) in step 812 to indicate the mismatching string and the character (pointed to by the index) at which the mismatch occurred.

The following is an example of the flow of operations on a list of input strings set out in Table 1.

TABLE 1

650-444-1111
555-555-5555
408-123-1111
518-093-1230
139-393-3300
100-123-3333
111_111_1111

The phase 1 function builds the baseline regular expression classes based on, for example, the first string '650-444-1111' as set forth in Table 2. The table shows the part of the string that matches the baseline regular expression class along with the starting and ending index for the matching part of the string.

TABLE 2

| index | baseline regular expression class | part of string | start index of part of the string | end index of part of the string |
|---|---|---|---|---|
| 1 | int | 650 | 1 | 3 |
| 2 | ws_int (ws means white space) | 650 | 1 | 3 |
| 3 | lower_int | 650 | 1 | 3 |
| 4 | upper_int | 650 | 1 | 3 |
| 5 | ws_upper_int | 650 | 1 | 3 |
| 6 | ws_lower_int | 650 | 1 | 3 |
| 7 | int_upper_lower | 650 | 1 | 3 |
| 8 | ws_upper_lower_int | 650 | 1 | 3 |
| 9 | punc_int | 650-444-1111 | 1 | 12 |
| 10 | ws_punc_int | 650-444-1111 | 1 | 12 |
| 11 | punc_lower_int | 650-444-1111 | 1 | 12 |
| 12 | punc_upper_int | 650-444-1111 | 1 | 12 |
| 13 | ws_punc_lower_int | 650-444-1111 | 1 | 12 |
| 14 | ws_punc_upper_int | 650-444-1111 | 1 | 12 |
| 15 | int_punc_lower_upper | 650-444-1111 | 1 | 12 |
| 16 | ALL | 650-444-1111 | 1 | 12 |
| 17 | punc | — | 4 | 4 |
| 18 | ws_punc | — | 4 | 4 |
| 19 | punc_lower | — | 4 | 4 |
| 20 | punc_upper | — | 4 | 4 |
| 21 | ws_punc_lower | — | 4 | 4 |
| 22 | ws_punc_upper | — | 4 | 4 |
| 23 | punc_lower_upper | — | 4 | 4 |
| 24 | ws_punc_lower_upper | — | 4 | 4 |
| 25 | int | 444 | 5 | 7 |
| 26 | ws_int | 444 | 5 | 7 |
| 27 | lower_int | 444 | 5 | 7 |
| 28 | upper_int | 444 | 5 | 7 |
| 29 | ws_upper_int | 444 | 5 | 7 |
| 30 | ws_lower_int | 444 | 5 | 7 |
| 31 | int_upper_lower | 444 | 5 | 7 |
| 32 | ws_upper_lower_int | 444 | 5 | 7 |
| 33 | punc | — | 8 | 8 |
| 34 | ws_punc | — | 8 | 8 |

TABLE 2-continued

| index | baseline regular expression class | part of string | start index of part of the string | end index of part of the string |
|---|---|---|---|---|
| 35 | punc_lower | — | 8 | 8 |
| 36 | punc_upper | — | 8 | 8 |
| 37 | ws_punc_lower | — | 8 | 8 |
| 38 | ws_punc_upper | — | 8 | 8 |
| 39 | punc_lower_upper | — | 8 | 8 |
| 40 | ws_punc_lower_upper | — | 8 | 8 |
| 41 | int | 1111 | 9 | 12 |
| 42 | ws_int | 1111 | 9 | 12 |
| 43 | lower_int | 1111 | 9 | 12 |
| 44 | upper_int | 1111 | 9 | 12 |
| 45 | ws_upper_int | 1111 | 9 | 12 |
| 46 | ws_lower_int | 1111 | 9 | 12 |
| 47 | int_upper_lower | 1111 | 9 | 12 |
| 48 | ws_upper_lower_int | 1111 | 9 | 12 |

Such baseline regular expression classes can be generated for one or more of the input strings.

The phase 2 function builds the specific regular expression, which matches all of the input strings. As described above, a first string, say '650-444-1111', is randomly selected. Next, a current regular expression is formed by the getBestRegex function. In the example, the function selects a baseline regular expression class among row 1 to row 8 that best fits the characters '6', '5', '0'. Because the (int) class is the best fit (e.g., it matches the least number of characters from all possible characters that exist, meaning it is the narrowest of the baseline regular expression classes in the table), the function adds int three times to the current_regex variable. The getBestRegex function starts its selection from leaves of the tree depicted in FIGS. 4 and 5, which have the highest priority and works its way up the tree. Thus, the current_regex variable contains (int)+(int)+(int), where '+' is a string concatenation. This notation can be simplified to (int){3}, where the number in braces indicates the number of repetitions of the previous item, and string concatenation is implied. As an example, in the Python regular expression module, the value of the current_regex is expressed as [0-9]{3}.

After the three integers is a punctuation mark (-). The function then selects among rows 17-24 to find the best class for the punctuation. The highest priority selection is the (punc) class. The function then updates the current_regex variable with the (punc) class so that the variable now contains (int){3}(punc){1}. In the Python regular expression module, the value of current_regex is [0-9]{3}[-]{1}.

After the punctuation mark are three more integers. The function selects among rows 25-32 to find the highest priority class, which is (int). The function adds the (int) class three times to the current_regex variable which is now (int){3}(punc){1}(int){3}.

After the second set of integers, the function encounters another punctuation mark and selects among rows 33-40, the highest priority class, which is (punc). The function updates the current_regex variable, which is now (int){3}(punc){1}(int){3}(punc){1}. In the Python module, the variable is expressed as [0-9]{3}[-]{1}[0-9]{3}[-]{1}.

After the second punctuation mark, the function encounters four more integers and selects among rows 41-48 the (int) class as the highest priority class. The function updates the current_regex variable with the four (int) classes so that the variable is now (int){3}(punc){1}(int){3}(punc){1}(int){4}, which is expressed as [0-9]{3}[-]{1}[0-9]{3}[-]{1}[0-9]{4} in the Python module.

Thus, after performing all of the concatenations, the final regular expression pattern string is (int){3}(punc){1}(int){3}(punc){1}(int){4}. Because the function has reached the last index, it has completed the building of a current_regex, which can be used on all of the input strings. In the case of the last string, the regular expression is (int){3}(punc){1}(int){3}(punc){1}(int){4}, where the punctuation includes both a hyphen and an underscore.

Next, the Test function uses this regular expression to test all of the strings in the list of input strings. Each string is considered in turn, and if the current_regex matches all of the strings, then the Test function returns with a (None, None) tuple, which is detected in the phase 2 function as a completion. If the current_regex pattern does not match one of the strings, then the Test function stops at that string and returns the tuple (string, index) indicating where the mismatch occurred. The phase 2 function re-executes the getBestRegex function on the mismatching string to get a better class or set of classes in a new current_regex. The cycle continues until the current_regex matches all of the input strings.

For example, if the current_regex for the first six strings is (int){3}(hyphen){1}(int){3}(hyphen){1}(int){4}, using the more specific classes of FIG. 5, then the Test function discovers that the last string, 111_111_1111, first fails at character 4 with the current_regex. This mismatch causes a more general class (lower priority) of punctuation to be used, such as (hyphen_underscore), as depicted in FIG. 5. The current_regex for all of the strings becomes (int){3}(hyphen_underscore){1}(int){3}(hyphen_underscore){1}(int){4}. In the Python module, this expression is [0-9]{3}[-|_]{1}[0-9]{3}[-|_]{1}[0-9]{4}(where the represents an 'inclusive or') and is thus a slightly more general expression that matches to all of the strings.

Such techniques may be used in specific use cases. For example, when a user submits a name of a file or receives an url at the computer system, the computer system may formulate a set of variations of the file name or url, and the name of the file or url along with the set of variations constitute the list of input strings. The variations include the addition of white space and punctuation to the file name or url and alterations of upper and lower case to the file name or url. The computer system then generates a set of baseline regular expression classes and then builds from the baseline regular expression classes a regular expression that is slightly more general than the file name or url submitted. The more general regular expression is used to find file names or urls that are similar to the one submitted or received. Finding file names or urls that are similar to the one submitted or received improves the operation of the computer system where strict matching of the file name or url would otherwise lead to not finding a file or not processing an url without user intervention.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer-readable media. The term computer-readable medium refers to any data storage device that can store data which can thereafter be input to a computer system—computer-readable media may be based on any existing or subsequently developed technology for embodying computer programs in a manner that enables them to be read by a computer. Examples of a computer-readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer-readable medium can also be distributed over a network coupled computer system so that the computer-readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system level virtualization, wherein an abstraction layer is provided on top of the kernel of an operating system on a host computer. The abstraction layer supports multiple OS-less containers, each including an application and its dependencies.

Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory, and I/O. The term "virtualized computing instance," as used herein, is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of automatically generating, by a computing device, a regular expression that matches a list of input strings, the method comprising:
   obtaining the list of input strings;
   identifying a set of baseline regular expression classes that each match at least a portion of at least one input string of the list of input strings, each baseline regular expression class of the set of baseline regular expression classes matching corresponding one or more characters,
   wherein the set of baseline regular expression classes comprises a plurality of first regular expression classes and one or more generated regular expression classes,
   wherein the plurality of first regular expression classes comprises one or more predefined baseline regular expression classes, and
   wherein each of the one or more generated regular expression classes is a combination of two or more of the plurality of first regular expression classes and matches the corresponding one or more characters of each of the two or more of the plurality of first regular expression classes;
   generating, based on a first input string of the list of input strings, a current regular expression as a sequence of baseline regular expression classes, the generating comprising, for each character of the first input string:

selecting a baseline regular expression class of the set of baseline regular expression classes that matches the character and that matches a least number of characters among any of the set of baseline regular expression classes that match the character;

determining whether the current regular expression matches all input strings of the list of input strings, the determining comprising, for each baseline regular expression class of the sequence of baseline regular expression classes:

determining whether the baseline regular expression class matches a corresponding character of each input string of the list of input strings;

for any baseline regular expression class of the sequence of baseline regular expression classes that does not match the corresponding character of an input string of the list of input strings:

updating the sequence of baseline regular expression classes of the current regular expression to include, in place of the baseline regular expression class, an updated baseline regular expression class that matches the corresponding character of the input string and the corresponding character of the first input string, wherein the updated baseline regular expression class is one of the one or more generated regular expression classes that is a combination of at least the baseline regular expression class and an additional baseline regular expression class of the set of baseline regular expression classes; and when the current regular expression matches all input strings of the list of input strings, setting the current regular expression as the regular expression.

2. The method of claim 1, wherein the plurality of first regular expression classes comprises one or more refined baseline regular expression classes.

3. The method of claim 1, wherein selecting the baseline regular expression class that matches the least number of characters includes selecting the baseline regular expression class at a lowest level of a tree organizing the set of baseline regular expression classes based on their inclusion of one another.

4. The method of claim 1, wherein the combination of at least the baseline regular expression class and the additional baseline regular expression class of the set of baseline regular expression classes is one that matches a least number of characters of all existing characters among the set of baseline regular expression classes.

5. The method of claim 1, wherein the list of input strings comprises a list of Uniform Resource Locators (URLs), and further comprising: accepting for processing by a browser all matches to the regular expression.

6. The method of claim 1,
wherein the list of input strings comprises a list of filenames, and
further comprising:
searching a filesystem for all matches to the regular expression; and
returning all the matches.

7. The method of claim 1, wherein for at least one of the one or more generated regular expression classes, the corresponding combination of two or more of the plurality of first regular expression classes is a combination of a predefined baseline regular expression class and a generated regular expression class.

8. A computing device configured to automatically generate a regular expression that matches a list of input strings, the computing device comprising:

a memory; and
a hardware processor coupled to the memory, the memory and processor being configured to:
obtain the list of input strings;
identify a set of baseline regular expression classes that each match at least a portion of at least one input string of the list of input strings, each baseline regular expression class of the set of baseline regular expression classes matching corresponding one or more characters,
wherein the set of baseline regular expression classes comprises a plurality of first regular expression classes and one or more generated regular expression classes,
wherein the plurality of first regular expression classes comprises one or more predefined baseline regular expression classes, and
wherein each of the one or more generated regular expression classes is a combination of two or more of the plurality of first regular expression classes and matches the corresponding one or more characters of each of the two or more of the plurality of first regular expression classes;
generate, based on a first input string of the list of input strings, a current regular expression as a sequence of baseline regular expression classes, the generating comprising, for each character of the first input string:
selecting a baseline regular expression class of the set of baseline regular expression classes that matches the character and that matches a least number of characters among any of the set of baseline regular expression classes that match the character;
determine whether the current regular expression matches all input strings of the list of input strings, the determining comprising, for each baseline regular expression class of the sequence of baseline regular expression classes:
determining whether the baseline regular expression class matches a corresponding character of each input string of the list of input strings;
for any baseline regular expression class of the sequence of baseline regular expression classes that does not match the corresponding character of an input string of the list of input strings:
update the sequence of baseline regular expression classes of the current regular expression to include, in place of the baseline regular expression class, an updated baseline regular expression class that matches the corresponding character of the input string and the corresponding character of the first input string, wherein the updated baseline regular expression class is one of the one or more generated regular expression classes that is a combination of at least the baseline regular expression class and an additional baseline regular expression class of the set of baseline regular expression classes; and
when the current regular expression matches all input strings of the list of input strings, set the current regular expression as the regular expression.

9. The computing device of claim 8, wherein the plurality of first regular expression classes comprises one or more refined regular expression classes.

10. The computing device of claim 8, wherein selecting the baseline regular expression class that matches the least number of characters includes selecting the baseline regular expression class at a lowest level of a tree organizing the set of baseline regular expression classes based on their inclusion of one another.

11. The computing device of claim 8, wherein combination of at least the baseline regular expression class and the additional baseline regular expression class of the set of baseline regular expression classes is one that matches a least number of characters of all existing characters among the set of baseline regular expression classes.

12. The computing device of claim 8,
wherein the list of input strings comprises a list of Uniform Resource Locators (URLs), and
wherein the memory and processor are further configured to: accept for processing by a browser all matches to the regular expression.

13. The computing device of claim 8,
wherein the list of input strings comprises a list of filenames, and
wherein the memory and processor are further configured to:
search a filesystem for all matches to the regular expression; and
return all the matches.

14. The computing device of claim 8, wherein for at least one of the one or more generated regular expression classes, the corresponding combination of two or more of the plurality of first regular expression classes is a combination of a predefined baseline regular expression class and a generated regular expression class.

15. A non-transitory computer-readable medium storing instructions that when executed by a computing device cause the computing device to perform a method of automatically generating a regular expression that matches a list of input strings, the method comprising:
obtaining the list of input strings;
identifying a set of baseline regular expression classes that each match at least a portion of at least one input string of the list of input strings, each baseline regular expression class of the set of baseline regular expression classes matching corresponding one or more characters,
wherein the set of baseline regular expression classes comprises a plurality of first regular expression classes and one or more generated regular expression classes,
wherein the plurality of first regular expression classes comprises one or more predefined baseline regular expression classes, and
wherein each of the one or more generated regular expression classes is a combination of two or more of the plurality of first regular expression classes and matches the corresponding one or more characters of each of the two or more of the plurality of first regular expression classes;
generating, based on a first input string of the list of input strings, a current regular expression as a sequence of baseline regular expression classes, the generating comprising, for each character of the first input string:
selecting a baseline regular expression class of the set of baseline regular expression classes that matches the character and that matches a least number of characters among any of the set of baseline regular expression classes that match the character;
determining whether the current regular expression matches all input strings of the list of input strings, the determining comprising, for each baseline regular expression class of the sequence of baseline regular expression classes:
determining whether the baseline regular expression class matches a corresponding character of each input string of the list of input strings;
for any baseline regular expression class of the sequence of baseline regular expression classes that does not match the corresponding character of an input string of the list of input strings:
updating the sequence of baseline regular expression classes of the current regular expression to include, in place of the baseline regular expression class, an updated baseline regular expression class that matches the corresponding character of the input string and the corresponding character of the first input string, wherein the updated baseline regular expression class is one of the one or more generated regular expression classes that is a combination of at least the baseline regular expression class and an additional baseline regular expression class of the set of baseline regular expression classes; and
when the current regular expression matches all input strings of the list of input strings, setting the current regular expression as the regular expression.

16. The non-transitory computer-readable medium of claim 15, wherein the plurality of first regular expression classes comprises one or more refined regular expression classes.

17. The non-transitory computer-readable medium of claim 15, wherein selecting the baseline regular expression class that matches the least number of characters includes selecting the baseline regular expression class at a lowest level of a tree organizing the set of baseline regular expression classes based on their inclusion of one another.

18. The non-transitory computer-readable medium of claim 15, wherein the combination of at least the baseline regular expression class and the additional baseline regular expression class of the set of baseline regular expression classes is one that matches a least number of characters of all existing characters among the set of baseline regular expression classes.

19. The non-transitory computer-readable medium of claim 15, wherein the list of input strings comprises a list of Uniform Resource Locators (URLs), and the method further comprising accepting for processing by a browser all matches to the regular expression.

20. The non-transitory computer-readable medium of claim 15, wherein for at least one of the one or more generated regular expression classes, the corresponding combination of two or more of the plurality of first regular expression classes is a combination of a predefined baseline regular expression class and a generated regular expression class.

\* \* \* \* \*